United States Patent [19]

McCormick

[11] Patent Number: 4,475,638
[45] Date of Patent: Oct. 9, 1984

[54] TRANSMISSION BRAKE AND CLUTCH

[75] Inventor: Stephen J. McCormick, Milwaukee, Wis.

[73] Assignee: Allis-Chalmers Corporation, Milwaukee, Wis.

[21] Appl. No.: 331,537

[22] Filed: Dec. 17, 1981

[51] Int. Cl.³ .............................................. B60K 41/24
[52] U.S. Cl. ..................................... 192/4 A; 74/411.5
[58] Field of Search ............ 192/4 C, 4 A, 4 R, 12 R, 192/48.91, 20, 18 R, 13 R, 17 R; 74/411.5, 339

[56] References Cited

U.S. PATENT DOCUMENTS

| | | | |
|---|---|---|---|
| 3,132,538 | 5/1964 | Zuppiger | 192/4 A |
| 3,321,054 | 5/1967 | Johnson et al. | 192/4 C |
| 3,498,425 | 3/1970 | Takada | 192/4 A |
| 4,148,382 | 4/1979 | Yamaoka et al. | 192/4 A |
| 4,211,313 | 7/1980 | Quick et al. | 192/4 A |

Primary Examiner—George H. Krizmanich
Attorney, Agent, or Firm—Arthur L. Nelson

[57] ABSTRACT

A transmission brake mounted on a clutch collar for braking the drive shaft. The brake operates to brake the speed of rotation of the drive shaft when the clutch is in any of the high, low or neutral positions.

10 Claims, 5 Drawing Figures

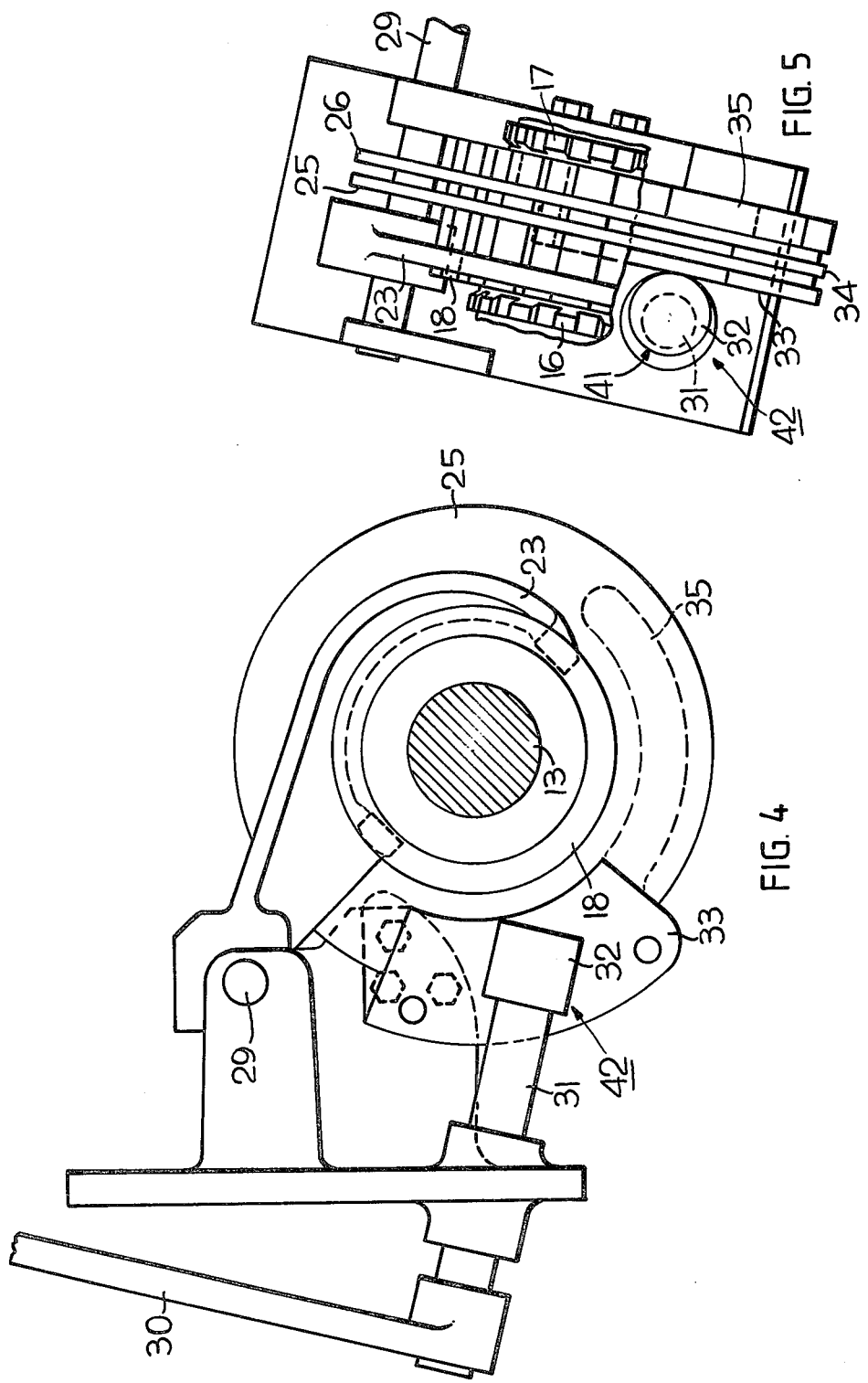

TRANSMISSION BRAKE AND CLUTCH

This invention relates to a vehicle drive shaft brake and more particularly to a brake having a disk carried on a clutch collar of a range transmission to brake a drive shaft of the final drive assembly.

Drive shaft brakes are used on motor vehicles as a means of locking the vehicle in the parked position. Normally, the use of the drive shaft brake requires an additional length of the drive shaft to accommodate positioning of the brake on the shaft. The brake may also be positioned at a right angle to the drive shaft with a bevel gear driven by the drive pinion. Either of these methods of braking requires additional space and means to connect the brake to the drive shaft.

The Quick patent, U.S. Pat. No. 4,211,313, shows a brake for a vehicle transmission. The brake is on a countershaft of the main transmission providing braking of the transmission. This type of a brake is usually used to aid in braking the rotational gear speed to permit shifting of the transmission. The applicant's invention provides a drive shaft brake for use on the final drive of the vehicle drive train. This vehicle has a range transmission to double the output speed ratios of the main transmission and with a clutch collar on the drive shaft which is selectively shifted between high, low and neutral positions to accommodate shifting of the range transmission. Brake disks are mounted on the clutch collar with a caliper type brake for selectively engaging the brake disks for braking of the vehicle. The brake is a mechanical brake and operates as an emergency brake for braking of the vehicle and is separate from any service brake which may be used on the drive wheels.

It is an object of this invention to provide a vehicle drive shaft brake on a clutch of a vehicle transmission.

It is another object of this invention to provide an emergency vehicle brake mounted on a clutch collar of the range transmission in conjunction with a drive shaft of the vehicle.

It is a further object of this invention to provide a vehicle parking brake on the vehicle drive shaft including brake disks mounted on a clutch collar of a range shift and providing a two-spaced shift on the final drive line of the vehicle and emergency braking for the vehicle through a mechanical means.

The objects of this invention are accomplished through the use of a range transmission which is mounted on the drive shaft driving a pinion engaging the ring gear of the differential. The range transmission selectively engages a low range or high range gearset to multiply the speed ratios of the main transmission transmitted to the drive shaft.

A reciprocating clutch collar on the drive shaft selectively engages the speed ratio in the final drive of the transmission. Carried on the clutch collar are brake disks which can be selectively engaged or disengaged by a manually operated caliper brake. The brake brakes the speed of rotation of the drive shaft whether the range shift is in high, low or neutral. It provides an emergency brake on the drive shaft for the vehicle.

Referring to the drawings, the preferred embodiment of this invention is illustrated.

FIG. 4 is a partial cross-section view of the drive shaft showing a portion of the range transmission and the vehicle brake.

FIG. 5 is a side elevation view of FIG. 4 showing a portion of the range transmission and the vehicle brake.

Figure 1:
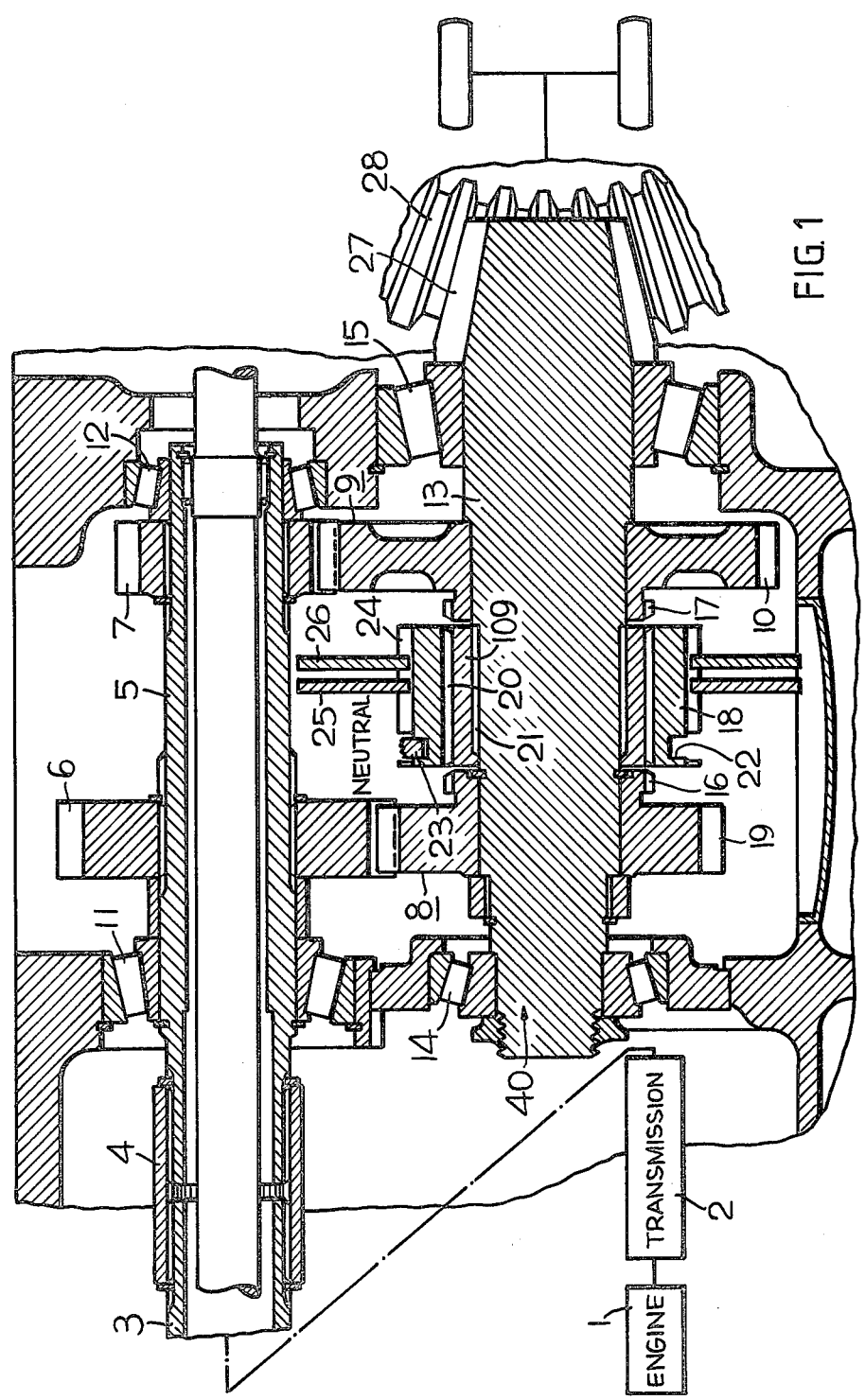
FIG. 1 illustrates a cross-section view of the range transmission and the emergency brake on the drive shaft. The range transmission is driven by an engine and the main transmission and drives a differential.
Figure 2:
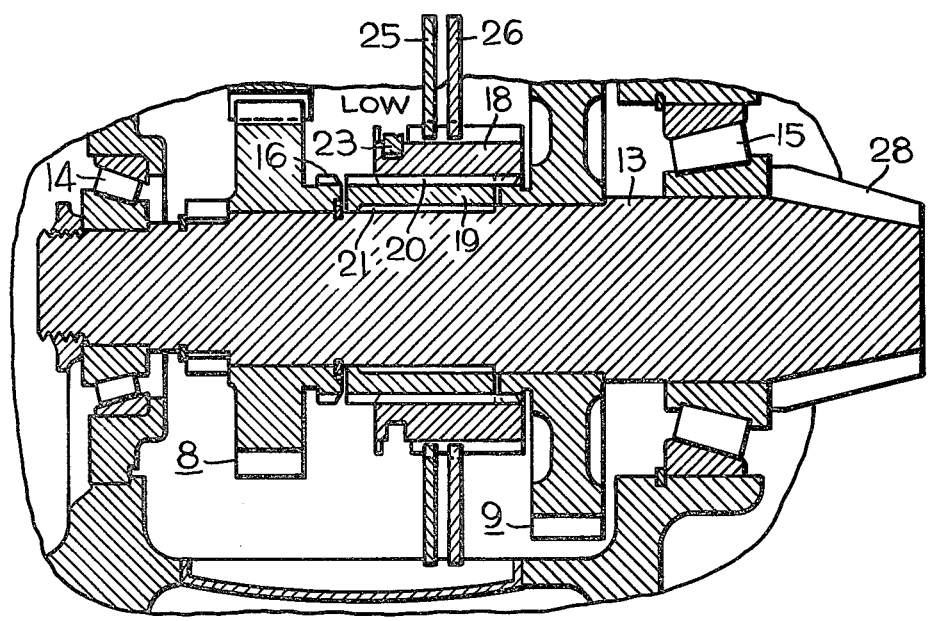
FIG. 2 illustrates a partial cross-section view of the brake and range transmission in the low range position.
Figure 3:
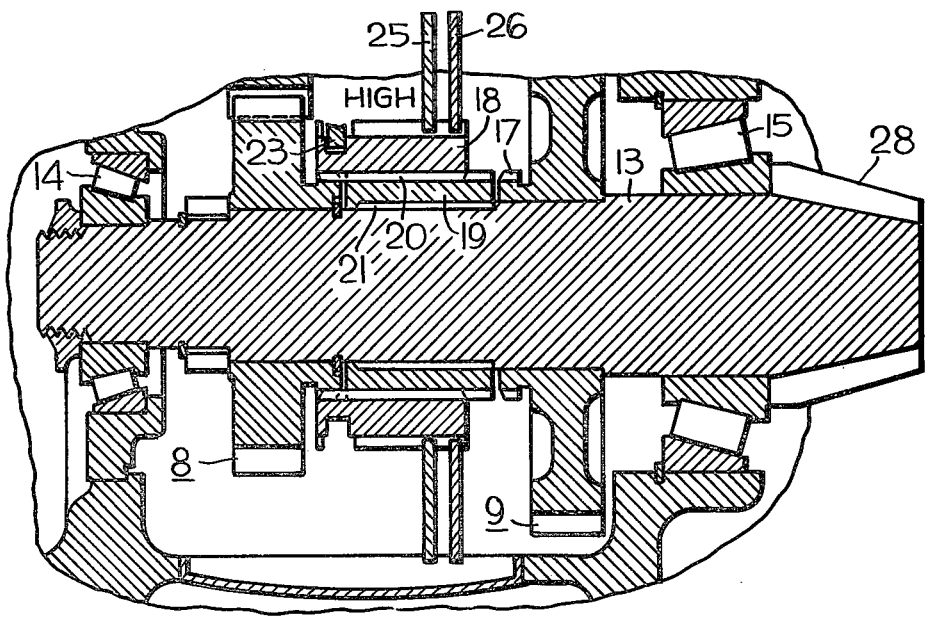
FIG. 3 is a partial cross-section view of the range transmission and brake in the high speed range.

Referring to FIGS. 1, 2 and 3, the engine 1 drives the main transmission 2 which in turn drives the quill shaft 3. The quill shaft 3 drives through a coupling 4 into the hollow shaft 5. The hollow shaft 5 is drivingly connected to gears 6 and 7 through mating splines. The gears 6 and 7 are the driving gears for the gearsets 8 and 9 of which the driven gears are 19 and 10. The hollow shaft 5 is rotatably carried in the bearing assemblies 11 and 12. Gears 19 and 10 are rotatably mounted on the drive shaft 13 which is rotatably supported in the bearing assemblies 14 and 15. Gears 19 and 10 are formed with clutch teeth 16 and 17 which selectively clutch the gears to the drive shaft 13 through the clutch collar 18. The clutch collar 18 is carried on a clutch sleeve 109 through mating spline connection 20. The clutch sleeve is reciprocally carried on the drive shaft through a mating spline connection 21. Clutch collar 18 is formed with an annular recess 22 which carries a shifting fork 23. The external periphery of the clutch collar 18 is also formed with an axial spline 24 which engage a mating spline on the brake disks 25 and 26. Accordingly, the clutch collar 18 can be retained in the neutral position as shown in FIG. 1 or reciprocated to the low speed range and high speed range as shown in FIGS. 2 and 3, respectively.

The drive shaft 13 is integral with the pinion gear 27 which drives into the differential 28 driving the rear wheels of the vehicle.

Referring to FIGS. 4 and 5, the shifter fork 23 is shifted axially by the shaft 29 to reciprocate the clutch collar 18 to shift the range transmission.

The caliper brake is manually operated through the brake lever 30 which rotates the shaft 31 and the cam 32. The cam 32 biases the pressure plate 33 against the brake disk 25 which in turn compresses the brake shoe 34 between the brake disks 25 and 26 and disk 26 against the reaction plate 35. Counterrotation of the cam 32 releases the brake and allows it to return to the disengaged or retracted position. Shifting of the shifter fork 23 reciprocates the sleeve clutch collar 18 to selectively engage clutch teeth 16 or 17 as the clutch collar shifts the range transmission. The operation of the device will be described in the following paragraphs.

When the engine 1 is running, it drives the transmission 2 which is selectively shifted through a plurality of speed ranges. The drive from the transmission 2 is through the quill shaft 3 and the hollow shaft 5. The hollow shaft 5 carries the gears 6 and 7 of the gearsets 8 and 9. The gearsets 8 and 9 selectively drive the drive shaft 13. The range transmission 40 is provided with a clutch collar 18 which can be selectively reciprocated by the shifting fork 23. The range transmission can be shifted between the low speed range as shown in FIG. 2, the neutral position as shown in FIG. 1 and the high speed position as shown in FIG. 3. The parking brake or emergency brake 41 is also formed on the clutch collar 18. The brake disks 25 and 26 are connected through a spline connection to the clutch collar 18. The brake 41 is operated through the cam 32 to selectively engage and disengage the brake disks 25 and 26 which brake the rotation of the drive shaft 13. Emergency brake 41 is operated by the control lever 30 which selectively rotates and counterrotates the cam 32 to engage or disengage the brake. The drive shaft 13 drives through the pinion 27 which drives the ring gear 28 of the differential which in turn drives the drive wheels. Accordingly, if the drive shaft is locked, this in turn locks the drive wheels and provides a parking brake for the vehicle.

The embodiments of the invention in which an exclusive property or privilege is claimed are defined as follows:

1. A vehicle transmission and brake comprising a transmission housing, an input shaft rotatably mounted in said housing, a drive shaft driving a differential, bearings rotatably supporting each end of said drive shaft in said housing, at least two gearsets on said shafts, a clutch collar reciprocally mounted on said drive shaft between said bearings for selectively and alternatively connecting each of said gearsets to drive said drive shaft, at least one brake disk nonrotatably connected to said clutch collar, a vehicle brake including said brake disk for selectively braking said drive shaft.

2. A vehicle transmission and brake as set forth in claim 1 wherein said drive shaft drives a pinion adapted for driving said differential.

3. A vehicle transmission and brake as set forth in claim 1 wherein said brake defines a vehicle parking brake.

4. A vehicle transmission and brake as set forth in claim 1 wherein said clutch collar defines high, low and neutral positions for selectively operating a range transmission.

5. A vehicle transmission and brake as set forth in claim 1 wherein said brake defines a caliper disk brake.

6. A vehicle transmission and brake as set forth in claim 1 wherein said transmission defines a range transmission driven by a main transmission to multiply the overall speed ratio of the drive line.

7. A vehicle transmission and brake as set forth in claim 1 wherein said brake defines a mechanical brake.

8. A vehicle transmission and brake as set forth in claim 1 including a clutch sleeve received within said clutch collar, means defining a spline connection between said clutch sleeve and said drive shaft, means defining a spline connection between said clutch sleeve and said clutch collar to provide reciprocal movement between said clutch collar and said sleeve and said sleeve and said drive shaft.

9. A vehicle transmission and brake as set forth in claim 1 including manual means for selectively and alternatively reciprocating said clutch collar between a high, low and neutral positions.

10. A vehicle transmission and brake as set forth in claim 1 including said input shaft, said gearsets selectively driving between said input shaft and said drive shaft, a clutch sleeve embracing said drive shaft and received within said clutch collar, means defining a spline connection between said clutch collar and said clutch sleeve and between said clutch sleeve and said drive shaft, means for shifting said clutch collar to selectively shift said transmission, manual means for selectively engaging and disengaging said brake.

* * * * *